United States Patent Office 3,740,287
Patented June 19, 1973

3,740,287
BONDING PLASTICS WITH PLASMA
ARC RADIATION
Robert Milne Eichhorn, Westfield, N.J., assignor to Union
Carbide Corporation, New York, N.Y.
No Drawing. Filed June 10, 1971, Ser. No. 151,923
Int. Cl. B29c 19/02
U.S. Cl. 156—272
13 Claims

ABSTRACT OF THE DISCLOSURE

Coated articles having an ethylene polymer coating strongly adhered to the base material are produced by exposing the coated base material to non-ionizing high intensity predominantly continuum light radiation having a source intensity of at least 350 watts per square centimeter steradian with less than 30 percent of the light radiated having a wavelength shorter than 4,000 angstroms units and at least 70 percent of the light radiated having a wavelength longer than 4,000 angstroms units. The exposed coated article can subsequently be heated to further improve adhesion.

BACKGROUND OF THE INVENTION

The manufacture of products having an ethylene polymer film tenaciously adhered to the surface of the base composition is of great commercial importance. In such products a strong bond between the polymer and the base is desired to protect the base material or to produce a durable product having unique properties. While many methods are known for producing laminated articles or coated articles the bonds are often weak and separation can occur.

In the production of coated articles, for example, wherein a metal has had an ethylene polymer coating applied to it or wherein a polymer film of the ethylene polymer is adhered to the metal, it is important that the bond between the ethylene polymer and the metal base material be strong enough to resist separation. The same is true when the bond is between the ethylene polymer and a wood base, or a mineral base, or a paper or fabric substrate. In addition, when a laminated structure of two or more plastic films is desired, it is important that the laminate layers do not separate from each other.

Among the common methods of bonding that have been used are the contacting of one material with another and subsequent application of heat and pressure, or the application of an adhesive or primer to one or more of the surfaces before bringing the materials together. In addition flame treatment and electrostatic treatment methods such as corona and glow discharge are known. These procedures are suitable to a degree but they are not always completely satisfactory, particularly with the ethylene polymers.

SUMMARY OF THE INVENTION

It has now been found that certain ethylene polymers can be placed in intimate contact with a non-ceramic base material or polymer and exposed to the non-ionizing high intensity predominantly continuum light radiation emitted by a plasma arc radiation source to produce a coated or laminated article of improved adhesion or bond strength. Surprisingly, and unexpectedly, this improvement in adhesion is not observed with other polymers used for the coating layer or with other non-ionizing light radiation sources. Among the base materials that are suitable one can mention metals such as iron, copper, aluminum, brass; paper, whether specially treated or not; wood; synthetic or natural fibers and fabrics, etc. The process can also be used to produce laminated films by laminating together two or more polymer films wherein the base polymer to which the ethylene polymer is adhered can be a polyamine, a polyester, a polystyrene, a vinyl halide polymer, a polysulfone, an alkyd resin, a polyurethane, a polyamide, and the like. In general no preliminary surface sensitization or treatment is required if the substrate surface is reasonably free of dirt or oils.

DESCRIPTION OF THE INVENTION

It has now been found that exposure of an article, which has had coated thereon or laminated thereto an ethylene polymer, to the non-ionizing high intensity predominantly continuum light radiation emitted by a plasma arc radiation source will produce a finished article or product having the ethylene polymer tenaciously adhered thereto. To obtain this improved adhesion the light radiation must reach the interface of the layers. It was surprising to find that this phenomenom is observed with certain ethylene polymers and is not observed with many other classes of polymers; that is to say many other polymers do not show this improved adhesion. It was also found that this phenomenom is not observed when glass, porcelain or similar highly polished ceramic surface is used as the base material.

In the process of this invention the article comprising the base material and the ethylene polymer applied thereon is exposed to the high intensity predominantly continuum light radiation emitted by the plasma arc radiation source and this exposure treatment causes the ethylene polymer to adhere to the base material. The mechanism or theory behind this phenomenom has not been completely established, but for our purposes the theory behind the reaction is of no consequence. It was a completely unexpected and unobvious finding that the exposure to the high intensity predominantly continuum light radiation emitted by a plasma arc radiation source would adhere the ethylene polymer to the base material with such effectiveness.

A number of suitable base materials have been referred to previously; however, many of the other known metals, natural products or polymers can also be used. The particular base material to be used does not appear critical with the exception noted to glass, porcelain and similar ceramic or inert surfaces. Any suitable or desired non-ceramic material can be used as the base material.

The ethylene polymers that are coated or adhered to the base material can be any of the known ethylene homopolymers, the copolymers of ethylene with acrylyl compounds, the copolymers of ethylene with vinyl acylates, or the copolymers of ethylene with other unsaturated hydrocarbons; and the term "ethylene polymers" as used herein applies to such polymers and copolymers. The ethylene homopolymers include the low density and high density polyethylenes, which are so well known that they require no further description. The copolymers with acrylyl compounds are those that contain up to about 35 weight percent of the acrylyl compound in the polymer, preferably up to about 25 weight percent thereof. Small amounts of other monomers can also be copolymerized therein. Illustrative are the copolymers of ethylene with acrylic acid, methacrylic acid, crotonic acid, itaconic acid, methacrylamide, methyl acrylate, methyl methacrylate, ethyl acrylate, butyl acrylate, butyl methacrylate, butyl ethacrylate, 2-ethylhexyl acrylate, cyclopentyl acrylate, and the like. The copolymers with vinyl acylates are those that contain up to about 35 weight percent of the ester in the polymer, preferably up to about 25 weight percent thereof. If desired, small amounts of other monomers can also be copolymerized therein. Illustrative thereof are the copolymers of ethylene with vinyl acetate, vinyl butyrate, vinyl propionate, and the like. The copolymers with other unsaturated hydrocarbon olefins are those that contain up to about 25 weight percent of said other olefin in the polymer. Illustrative thereof are the copolymers of ethylene with propylene, butene-1, hexene-1, bicyclo[2.2.1]hept - 2 - ene, bicyclo[2.2.1]hept-2,5-diene, 5-ethylidenebicyclo[2.2.1]hept - 2 - ene, butadiene, hexadiene-1,4, and the like. If desired, small amounts of other monomers can also be copolymerized therein. One can use a single comonomer to produce a copolymer or a mixture of comonomers to produce terpolymers, tetrapolymers, and more complex copolymeric compositions; this is known in the art. In addition one can have small amounts of other monomers such as, for example, the vinyl halides, vinyl ketones, vinylidene halides, etc., copolymerized in the polymer provided that these are not present in the polymer in amounts sufficient to change the basic characteristics of the ethylene polymers defined above as useful and have an appreciably adverse effect on adhesion.

The ethylene polymer can be applied to the base composition by any suitable means that provides intimate contact. It can be applied by spray coating, extrusion coating, hot melt application, co-extrusion, solvent coating, as a pre-formed film pressed to the surface of the base composition, etc. The manner of bringing the two or more layers together is not the essence of this invention. The essence of this invention is the discovery that an article that has been coated with an ethylene polymer herein defined when treated by the process herein disclosed and claimed will have a better adhesive bond between the ethylene polymer and the base material than could be obtained therebetween by previous known methods. This is true with coatings and with laminates.

Film laminate compositions can contain two or more polymer films, at least one of which is one of the hereinbefore defined ethylene polymers. Laminates can also be produced containing at least one layer of ethylene polymers in which the other layer or layers can be a natural or synthetic woven or non-woven fabric or scrim, or fibers that are located in a random or ordered configuration; these laminates can be exposed to the non-ionizing high intensity predominantly continuum light radiation emitted by a plasma arc radiation source. The laminates of this invention can be produced by contacting the preformed layers with each other and applying pressure or both heat and pressure to obtain an intimate contact. They can also be produced by extrusion of one of the layers on to one of the other layers, or by the simultaneous extrusion of the layers with the extruded layers brought into contact with each other either before or after they have cooled and solidified. Any conventional method can be used to prepare the laminate structure before it is treated by the process of this invention.

The thickness of each layer in the film laminate structure can vary from about 0.5 mil or less to about 10 mils. The total thickness is determined by the application in which the laminated structure is to be used and the properties sought in the final product.

As previously indicated, in one aspect of this invention, the processes of this invention can be used to produce articles having an ethylene polymer coating or film strongly adhered to a non-plastic base material. Thus, the ethylene polymer coatings can be applied to metal plates, sheets, rods, tubes or other shaped articles; they can be applied to wire, paper, coated paper, cardboard, wood, fibers and fabrics, etc. The methods by which such coatings can be applied are well known to those skilled in the art and need not be discussed in detail here. The coatings on such substrates can vary from about 0.25 mil to about 100 mils thick.

The ethylene polymers used in this invention can, if desired, contain pigments which do not interfere appreciably with the light energy used. Thus, it has been found that titanium dioxide, zinc oxide or silica can be used in small amounts; generally up to about 15 weight percent. The amount of pigment used is generally inversely proportional to the thickness of the film. However, carbon black or darkly colored pigments (which absorb or reflect the light) cannot be used in an appreciable amount without deleteriously affecting the reaction since they may prevent sufficient emitted radiation from reaching the interface; small or trace amounts can be used.

One can, if desired, effect a crosslinking of the polymer while treating the coated article to obtain adhesion of the ethylene polymer to the base composition by the addition of a photosensitizer to the polymer before subjecting the coated article to the non-ionizing high intensity predominantly continuum light radiation emitted by a plasma arc radiation source. The photosensitizer serves merely to crosslink the polymer, it does not generally further improve adhesion. Shrould crosslinking be desired, the photosensitizer can be blended into the polymer at a concentration of from about 0.25 weight percent to about 5 weight percent, preferably from about 0.5 weight percent to about 2 weight percent, based on the weight of the polymer. These photosensitizers are well known to those skilled in the art and include, illustratively, acetophenone, propiophenone, benzophenone, xanthone, fluorenone, benzaldehyde, anthraquinone, 2- or 4-pentylacetophenone, 2- or 4-methoxyacetophenone, 3- or 4-chlorobenzophenone, 4,4'-dimethoxybenzophenone, 4-chloro-4'-benzylbenzophenone, 3 - chloroxanthone, 3-methoxyxanthone, and the like.

To obtain the improved adhesion properties, the polymer-coated article or the laminated structure is exposed to artificially generated non-ionizing high intensity predominantly continuum light radiation emitted from a plasma arc radiation source to permit the light to impinge the interface. The discovery that this high intensity predominantly continuum light radiation emitted by a plasma arc radiation source would enhance the adhesion of the ethylene polymers to other substrates with such brief exposure periods was a completely unexpected and unobvious finding.

The coated or laminated structure can be exposed to the non-ionizing high intensity predominantly continuum light radiation from the plasma arc radiation source at a temperature of from about room temperature to about the crystalline melting point of the particular ethylene polymer being used. It has been found that heating the structure to a temperature below the crystalline melting point of the exposed ethylene polymer after the structure has been exposed to the non-ionizing high intensity predominantly continuum light radiation often results in a further improvement in adhesion. This is particularly true in the case of polyethylene coatings on iron or copper. However, heating the structure without exposure to the non-ionizing high intensity predominantly continuum light radiation will not generally result in improved adhesion.

The non-ionizing high intensity predominantly continuum light radiation used to adhere the ethylene polymer to the base structure is generated artificially. Recently apparatus was discovered capable of emitting non-ionizing high intensity predominantly continuum light radiation that contains ultraviolet, visible and infrared radiation. This apparatus is the plasma arc light radiation equipment. It was also discovered that by means of proper light filters one can selectively screen out a portion of this continuum light radiation emitted, permitting only that wavelength portion desired to reach the material that is being treated.

The term "non-ionizing high intensity predominantly continuum light radiation" means continuum radiation emitted from a plasma arc radiation source having a source intensity of at least 350 watts per square centimeter steradian (about 1,000 kilowatts per square foot of source projected area) having only a minor part of the energy in peaks of bandwidths less than 100 angstrom units, with less than about 30 percent of the light radiated having wavelengths shorter than 4,000 angstrom units and at least about 70 percent of the light energy radiated having wavelengths longer than 4,000 angstrom units. This is to be distinguished from the typical low intensity ultraviolet light line structure generated by the known mercury lamps. The largest commercially available mercury lamps generally have an electrical input of about 20 kilowatts (the source intensity is generally no greater than about 20 kilowatts per square foot of source projected area).

This light radiation is derived from a plasma arc radiation source that generates non-ionizing high intensity predominantly continuum light radiation with a source intensity of at least about 350 watts per square centimeter steradian, as abbreviated by the term: watts/cm..²sr.¹; said non-ionizing high intensity predominantly continuum artificial light radiation has about 70 percent of the light radiated at a wavelength longer than 4,000 angstroms and less than about 30 percent of the light radiated having a wavelength shorter than 4,000 angstroms, generally about 80 percent of the light radiated has a wavelength longer than 4,000 angstroms and less than about 20 percent of the light radiated has a wavelength shorter than 4,000 angstroms, and a source intensity that can vary from about 350 watts (about 1,000 kilowatts per square foot of source projected area) to about 5,000 watts (about 15,000 kilowatts per square foot of source projected area), or more, per square centimeter steradian. A convenient source for the generation of non-ionizing high intensity predominantly continuum light radiation is a swirl-flow plasma arc light radiation apparatus. The plasma arc radiation equipment for generating non-ionizing high intensity predominantly continuum light radiation by this means is known and available with many different forms thereof described in the literature. A highly efficient apparatus for producing non-ionizing high intensity predominantly continuum light radiation is the swirl-flow plasma arc radiation source described in U.S. 3,364,387. The apparatus or equipment necessary for generating the defined light radiation is not the subject of this invention. While any artificial source of generating non-ionizing high intensity predominantly continuum light radiation can be used, as previously indicated the swirl-flow plasma arc radiation apparatus is a most convenient source. Hence, this source will be used in this application as illustrative of a means for obtaining the non-ionizing high intensity predominantly continuum light radiation useful in the processes of this invention. These apparatuses are often known by other terms but those skilled in this art recognize that they emit non-ionizing high intensity predominantly continuum light radiation. The source of the radiation in a 50 kilowatt swirl-flow plasma arc radiation source is an arc that is only about four inches long enclosed in a quartz envelope about 1.5 inches in diameter. This lamp can be readily removed and refurbished and has an acceptable long lifetime. Further, a swirl-flow plasma arc radiation apparatus having a 250-kilowatt rating would be only about two or three times as large as a 50-kilowatt source. Other advantages include the absence of a need for expensive radiation shielding that is required when using electron beams or radioactive materials and the absence of pollution caused by mercury present in the discarded mercury ultraviolet lamps. Precautions required for the artificial light sources include those needed to protect one's eyes from the intense visible light and also to protect oneself from the ultraviolet light present to prevent inadvertent sunburn effect on the body.

It is to be noted that in the spectra of non-ionizing high intensity predominantly continuum light radiation there is a continuum of radiation throughout the entire spectral range. This type of continuum radiation in the ultraviolet range has not heretofore been obtainable from the conventional commercial mercury arcs or lamps generally available for generating ultraviolet light. The use of mercury lamps for generating ultraviolet light produces light that shows a line or peak spectrum in the ultraviolet range, it is not a continuum spectrum in the ultraviolet range. In a line spectrum the major portion of useable ultraviolet light is that portion at which the line or band in the spectrum forms a peak. In order for such energy to be useful for promotion of adhesion, the material or composition that is to be treated with ultraviolet radiation must be capable of absorbing at that particular wavelength range at which the peak appears. In the event the material or composition does not have the ability to absorb at that particular wavelength range at which the peak occurs there is little or no absorption or reaction. Thus, in the event the material or composition to be treated absorbs at a particular wavelength range in one of the valleys of the spectral curve there will be little or no reaction since there is little or no ultraviolet energy to adequately excite the system. With non-ionizing high intensity predominantly continuum radiation there is a high intensity continuum radiation of ultraviolet energy across the entire ultraviolet wavelength range of the spectrum and there is generally sufficient ultraviolet energy generated at all useful ultraviolet wavelengths to enable one to carry out reactions responsive to ultraviolet radiation without the problem of selecting compound that will absorb at the peak wavelength bands only. With the non-ionizing high intensity predominantly continuum radiation now discovered one does not have the problem of being unable to react materials or compositions that absorb in the valley areas only since for all intents and purposes such valleys do not exist in high intensity predominantly continuum radiation, the high intensity radiated light energy is essentially a continuum, it is not emitted in peak bands.

Non-ionizing high intensity predominantly continuum light radiation is to be distinguished from low intensity ultraviolet radiation generated by commercially available low, medium and high pressure mercury arc ultraviolet lamps. These mercury arc lamps produce light emission which is primarily line or peak rather than continuum light, wherein a major part of the light appears in bands narrower than 100 angstrom units and much less than 70 percent of the emitted light has wavelengths above 4,000 angstrom units.

As is known, non-ionizing high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder, creates a swirling flow or vortex which restricts the arc to a small diameter. An electrical potential applied across the electrodes causes a high density current to flow through the gas to generate a plasma composed of electrons, positively charged ions and neutral atoms. The plasma generated in the above gases produces non-ionizing high intensity predominantly continuum light radiation with diffuse maxima in the region of from about 3,500 to about 6,000 angstroms. The radiation source can also be used with reflectors or refractive optical systems to direct the non-ionizing high intensity predominantly continuum light radiation emanating from the arc to a particular point or direction or geometrical area.

The coated or laminated article can be at a distance up to several feet from the light source. The distance is not controlling, but a shorter distance is preferred for optimum utilization of the energy generated. The particular distance will vary depending upon the power energy of the specific light source, the surface area to be treated, and the design and location of any reflective means employed.

The exposure to the non-ionizing high intensity predominantly continuum light radiation can vary from about 0.05 second to about 150 seconds or more, preferably from about 0.1 to about 30 seconds. This can be carried out at any temperature below the decomposition temperature of the polymers being used. It is preferable, but not necessary, to carry out the exposure while the ethylene polymer is in a fluid or molten state on the base material. The exposure time and temperature will vary with the particular polymers being used, the nature of the substrate, the intensity of the light, the thickness of the polymer compositions and the distance of the light source from the surface. Those skilled in the coating and laminating arts are well aware of these points and are capable of adjusting them to obtain a suitable finished product.

The following examples serve to further describe this invention. In these examples the melt index was measured according to the procedure set forth in ASTM D 1238–62 T and the density according to the procedure in ASTM D–1505–63T.

EXAMPLE 1

A one mil thick film of polyethylene was extrusion coated at about 600° F. upon a 2 mils thick substrate film of commercial grade polyethylene terephthalate, as received, with no prior surface treatment. The polyethylene contained no additives; it had a melt index of 4 decigrams per minute and a density of 0.924 gram per cc. Samples of this coated specimen were aged for periods of 6 months and 10 months and then exposed to the non-ionizing high intensity predominantly continuum light radiation emitting from an 80 kilowatt plasma arc radiation source at a distance of 4 feet for various periods of time at about 23° C. Before exposure to the non-ionizing predominantly continuum light radiation emitted from the plasma arc radiation source the layers were in intimate physical contact but there was no adhesion between them and they could be separated by an insignificantly small pulling force. After exposure for periods as short as 0.1 sec. the adhesion that developed between the coating and substrate was so tenacious that they could not be mechanically separated at all by pulling.

EXAMPLE 2

Coatings of polyethylene with thicknesses of 0.5 and 1.0 mil were extrusion coated at about 600° F. upon substrates of Kraft paper, aluminum foil, and clay coated cardboard. The polyethylene had a melt index of 4 decigrams per minute and a density of 0.924 gram per cc.; it contained a small amount of antioxidant 1,1,3-tris(-5-tert-butyl-4-hydroxy-2-methylphenyl)butane but no photosensitizer. The coated compositions were exposed to the non-ionizing predominantly continuum light radiation from an 80 kilowatt argon plasma arc radiation source at a distance of four feet and the treated compositions were evaluated. The results are set forth below.

The exposure was at a distance of four feet from the arc and strong adhesion was achieved in the exposure times indicated:

| Coating polymer | Extrusion temp., °F. | Substrate | Exposure time, sec. |
| --- | --- | --- | --- |
| Ethylene vinyl acetate containing 20% vinyl acetate, MI=30. | 205 | Poly(ethylene terephthalate). | 1 |
| | | Aluminum foil | 3 |
| | | Cotton cloth | 1 |
| | | Rayon cloth | 3 |
| | | Paper | 1 |
| Hot melt coating containing 40% of the above ethylene vinyl acetate copolymer, 5% polyterpene resin, and 55% petroleum waxes. | 130 | Poly(ethylene terephthalate). | 1.5 |
| | | Aluminum | 1.5 |
| | | Paper | 1 |
| Ethylene ethyl acrylate copolymer containing 18% ethyl acrylate, MI=6. | 290 | Poly(ethylene terephthalate). | 0.3 |
| | | Cotton cloth | 1 |
| Ethylene acrylic acid copolymer containing 3.5% acrylic acid, MI=6. | 305 | Poly(ethylene terephthalate). | 0.75 |

EXAMPLE 4

Coatings of polyethylene 20 mils thick were laminated to cold rolled steel panels by hot pressing in a compression mold. After pressing the coatings were in intimate physical contact with the panels but the measured peel force was zero pounds per inch. The polyethylene used had a melt index of 0.2 decigram per minute and a density of 0.961 gram per cc. Another set of coated panels was made which were duplicates except that the polyethylene contained one weight percent benzophenone as phostosensitizer. The coated panels also showed no adhesion. Duplicates of the coated panels were exposed to the non-ionizing high intensity predominantly continuum light radiation from an 80 kilowatt argon plasma arc radiation source for 60 seconds at a distance of 4 feet from the light source. After exposure strong adhesion had developed between the polyethylene coating and the steel in both cases and the polyethylene containing benzophenone had also undergone crosslinking.

| | Peel strength, lb./in. | | Percent gel | |
| --- | --- | --- | --- | --- |
| Sample | Control | After exposure | Control | After exposure |
| Polyethylene alone | 0 | 10 | 0 | 1 |
| Polyethylene and photosensitizer | 0 | 9.25 | 0 | 69 |

This example shows that the presence of a photosensitizer does nothing to improve adhesion. Whether or not the photosensitizer was present neither coated panel showed adhesion of the polymer to the steel before exposure and both coated panels showed strong adhesion

| Substrate | Polyethylene coating thickness (mils) | Percent antioxidant | Exposure time (sec.) | Bond strength | | Peel force expressed as percent fibre tear | |
| --- | --- | --- | --- | --- | --- | --- | --- |
| | | | | Control | Exposed | Control | Exposed |
| 30#/ream Kraft paper | 1.0 | 0.15 | 7 | None | Good | 0 | 100 |
| Do | 0.5 | 0.05 | 7 | Poor | Excellent | 12 | 100 |
| Do | 1.0 | 0.0 | 14 | None | Good | 0 | 100 |
| Clay coated cardboard | 1.0 | 0.05 | 17 | 0.7#/inch | Inseparable | | |
| Aluminum foil | 1.0 | 0.0 | 14 | 1.1 | T¹ | | |
| Do | 1.0 | 0.05 | 7 | 1.1 | T¹ | | |
| Do | 1.0 | 0.15 | 7 | 1.1 | T¹ | | |

¹ T means that the substrate and coating both tore, thus a significant value could not be measured or determined. This is an indication of a strong adhesive bond.

EXAMPLE 3

Ethylene copolymers were extrusion coated 2 mils thick at 63 feet per minute on various substrates. Under the conditions used there was intimate contact between the layers but there was no adhesion between the layers. Subsequently, portions of the composites were exposed to the non-ionizing high intensity predominantly continuum light radiation emitted by an 80 kilowatt argon plasma arc radiation source to determine the exposure time required to produce strong adhesion between the layers.

after exposure. The results also show that the main effect of the presence of the photosensitizer is to crosslink the polymer, as indicated by the high gel content of that polymer after exposure.

EXAMPLE 5

Thin coatings, 0.5, 1.0, and 1.5 mils thick, of a white pigmented polyethylene were extrusion coated upon kraft paper. The polymer had melt index of 3 decigrams per minute and a density of 0.917 gram per cc. It contained 12 weight percent titanium dioxide and had a nominal compounded density of one gram per cc. These coated papers were stored for eleven months and exhibited no measureable adhesion of the polymer to the paper. After this storage period they were given a 3 seconds exposure to the non-ionizing high intensity predominantly continuum light radiation from an 80 kilowatt argon plasma arc radiation source. These was a great improvement in adhesion and the layers of the composite were now separated only with difficulty and with some fibre tear. Exposures as short as 0.6 second on the same coated paper also produced a noticeable improvement in adhesion of the polymer to the kraft paper.

The adhesion test used for the qualitative results reported in the examples of this specification was to cut a 1 inch wide strip of the coated composite, one end of which had been separated before exposure, and pulling the coating off the substrate by hand. Particularly for paper, where the paper fibres tear and stay with the coating after separation, this method is more significant than a measured peel force determined instrumentally.

EXAMPLE 6

A thin coating of a copolymer of ethylene having an acrylic acid content of seven weight percent was deposited upon aluminum foil by extrusion coating and stored for about 12 months. The polymer side of the coated foil was exposed to the non-ionizing radiation from an 80 kilowatt argon swirl flow plasma arc radiation source after this storage period. Before exposure, but after storage, the adhesion between substrate and coating was poor. After exposure for two seconds at a distance of about four feet from the light source there was a very definite improvement in adhesion of the layers to one another.

EXAMPLE 7

One and two mil thick coatings of polyethylene were extrusion coated on two mils thick poly(ethylene terephthalate) and on 1.5 mils thick aluminum foil at about 620° F. The polyethylene contained 0.1 weight percent 4,4' - thiobis(6-t-butyl-m-cresol) as stabilizer and it had a density of 0.924 gram per cc. and a melt index of 4 decigrams per minute. Similarly, laminted products were produced using the same polyethylene additionally containing 0.5 weight percent benzophenone.

The laminated structures were exposed to the non-ionizing high intensity predominantly continuum light radiation emanating from an 80 kilowatt argon swirl-flow plasma arc light source at a distance of about four feet from the light for about 20 seconds. The laminates that were exposed to the high intensity light energy were adhesively bonded together and the two layers could not be separated from each other without ripping of the laminate layers. This was still observed even after soaking in water at room temperature for over 60 hours. The layers of the unexposed laminates were easily separated from each other. The presence of benzophenone made no measurable difference in the extent to which adhesion was improved; the unexposed laminates showed an adhesion value of about 0.5 lb./in. whereas the exposed laminates were inseparable without ripping.

It was also found that the heat seal strength of the polyethylene-aluminum foil laminates was improved after exposure to the high intensity light energy. For example, the heat seal strength of the unexposed laminate with the two mils thick polyethylenes was 3.4 lb./inch whereas the heat seal strength of the exposed laminate was 4.9 lb./inch; this is an improvement of 44% in heat seal strength. The laminate having a one mil thick coating showed a 47% improvement in heat seal strength. Such improvements were noted whether or not the benzophenone was present.

EXAMPLE 8

A cellophane film having a 0.5 mil film of poly(vinylidene chloride) on the surface had extrusion coated to the poly(vinylidene chloride) surface thereof a one mil film of polyethylene having a density of 0.924 gram per cc. and a melt index of 4 decigrams per minute; the polyethylene contained 0.05 weight percent of 1,1,3-tris(5-t-butyl-4-hydroxy - 2 - methylphenyl)butane. This structure showed a zero adhesion of the polyethylene to the laminate. A portion of the three component laminate was exposed to the non-ionizing high intensity predominantly continuum light radiation emanating from a 50 kilowatt argon swirl-flow plasma arc at a distance of four feet from the arc for about ten seconds. While measuring the peel force the substrate tore at 1.2 lb./inch; this is an indication that the strength of the adhesive bond exceeded the strength of the substrate cellophane film.

EXAMPLE 9

A series of experiments was carried out in which a one mil thick film of polyethylene having a density of 0.924 gram per cc. and a melt index of 4 decigrams per minute was tack sealed at 85–95° C. under a pressure of about 30 p.s.i. to substrates of various commercially available film materials and then the polyethylene surfaces of the laminates were exposed to the non-ionizing high intensity predominantly continuum light radiation emanating from an 80 kilowatt argon swirl-flow plasma arc light source. The exposure was carried out by continuously passing the film laminate under the light source at a rate of speed to give the exposure times indicated in the tables below. In all instances a strong adhesive bond was formed between the polyethylene and the stubstrate.

| Substrate | Exposure time, sec. | Bond |
|---|---|---|
| Aluminum foil | 1.5 | Excellent. |
| Polyester foil | 1.2 | Tenacious. |
| Polysulfone film | 4 | Inseparable. |
| Paper | 4 | Excellent. |
| Polystyrene film | 4 | Inseparable. |
| Cellophane film | 1.2 | Do. |
| Polyamide film | 4 | Excellent. |

In the above, the laminated structures not exposed to the light source were evaluated as controls for comparative purposes and in all instances the controls showed little or no bonding or adhesion between the two films. An attempt to coat glass with this polyethylene was unsuccessful, there was no adhesion after a five seconds exposure of the coated glass composite to the light source. Also unsuccessful were attempts to produce strongly bonded laminate strurtures of polyamide film to aluminum foil, polyamide film to poly(ethylene terephthalate) film, and polystyrene to poly(ethylene terephtalate film. The latter two combinations showed no signs of bonding whatsoever even from the initial heat sealing.

EXAMPLE 10

Coated steel panels were prepared by laminating films of polyethylene containing 0.5 weight percent benzophenone to the panels. The polyethylene had a density of 0.96 gram per cc. and a melt index of 0.2 decigram per minute, the film used was 15 mils thick. The coatings were prepared by compression molding the polymer in contact with the cold rolled steel panels for four minutes at 150° C. and about 100 p.s.i. followed by one minute at about 2,000 p.s.i.; six inch square coated panels were made. The coated panels were exposed to the non-ionizing high intensity predominantly continuum light radiation emanating from a 50 kilowatt argon swirl-flow plasma arc light source at a distance of two feet from the arc for varying periods of time. The adhesion of the polyethylene was then determined by scoring a one inch wide strip the length of the coating through the coating down to the metal, lifting one end of the coating (which had been separated from the steel panel before exposure), punching a hole through it to enable one to fasten the coating to the hook of a spring balance, and then pulling the one inch wide strip free from the metal at a rate of one inch per minute in a plane normal to the surface of the metal. The peel force is reported in pounds per inch. It was found that a significant improvement in adhesion was achieved with an exposure of about 30 seconds; the results are set forth below:

| Exposure time, sec. | Peel force, lb./in. | Gel, percent |
| --- | --- | --- |
| 0 | 1 | 3 |
| 5 | 1 | 8 |
| 15 | 1 | 15 |
| 30 | 4 | 32 |
| 60 | 14 | 43 |

Improved adhesion was also observed when a 15 mil film of polyetheylene (melt index of 2 decigrams per minute, density of 0.918 gram per cc.) containing 0.5 weight percent benzophenone was compression molded in the same maner to a 10 mil brass sheet and then exposed to the plasma arc light for 30 seconds at a distance of two feet. A fifty percent increase in peel force over the control was measured.

When polypropylene or polysulfone were used instead of polyethylene, one did not observe any significant adhesion of these polymers to the metal surfaces.

Also, simply heating the unexposed coated panels to an equal temperature for the same period of time by the use of a heat lamp, oven, or hot plate did not produce any significant improvement in adhesion.

EXAMPLE 11

Copper wire, about 65 mils in diameter, insulated with a 30 mils thick layer of polyethylene containing 0.5 weight percent benzophenone as a photosensitizer and having a melt index of 0.1 decigram per minute and a density of 0.917 gram per cc, was exposed to the non-ionizing high intensity predominantly continuum light radiation emanating from a 35 kilowatt argon swirl-flow plasma arc light source. The insulated wire was exposed at a distance of six inches from the lamp for 50 seconds. A rise in temperature was observed during exposure, the treated conductor was then cooled in air (Conductor A). A portion of the untreated conductor was retained for comparison of properties (Control A).

Another copper conductor that was insulated with a polyethylene having a melt index of about 0.22 decigram per minute and a density of 0.945 gram per cc. was similarly treated; the polyethylene contained 0.5 weight percent benzophenone (Conductor B). A portion of this untreated conductor was retained for comparison purposes (Control B).

The stripping force and gel content were determined. A Scott Tester is used in the determination of stripping force, which is the force in pounds required to pull a six inch length of wire out of the insulation that surrounds it. In this test a piece of conductor about 7-8 inches long is used. The insulation is removed from one end leaving six inches of insulated conductor. The conductor is placed in the holder with the exposed stripped portion passing through an orifice slightly larger than the diameter of the copper strand and the insulation resting on the top of the orifice. The protruding end of the stripped copper wire is gripped in the gripping jaws of the Scott Tester and the wire is pulled out of the insulation at a rate of twenty inches per minute while recording the stripping force, in pounds, required. The stripping force is converted to p.s.i. The gel content, which is a measure of molecular crosslinking, was determined by extraction with boiling decalin to constant weight. The results are set forth below.

| | Stripping force, p.s.i. | Gel, percent |
| --- | --- | --- |
| Conductor A | 106 | 66 |
| Control A | 30 | 1 |
| Conductor B | 99 | 77 |
| Control B | 77 | 1 |

It was observed that there was no sign of an adhesive bond of the polyethylene to the copper in either of Controls A or B, the polymer slipped off easily and it had a smooth appearance. On the other hand, the polyethylene adhered tenaciously to the copper in Conductors A and B; it was difficult to remove and after removal it had a corrugated, bead-like appearance, it was not smooth. The adhesion obtained and observed by this process was completely unexpected and unobvious.

A similar strong adhesive bond was achieved when a film of polyethylene, which had a melt index of 2 decigrams per minute, a density of 0.918 g./cc., containing 0.5 percent benzophenone, and having a thickness of about 20 mils, was hot pressed to a copper sheet at a temperature about the melting point of the polymer to produce a laminated structure and then exposing the polymer side of the laminate to the non-ionizing high intensity predominantly continuum light radiation emanating from a 35 kilowatt argon swirl-flow plasma arc for about 30 seconds. In contrast, there was no adhesion observed on a laminate produced under the same conditions that was not exposed to the light radiation from the plasma arc.

Neither polypropylene nor polysulfone succeeded in producing a product in which neither of these polymers showed any significant adhesion to the copper. It was also observed that the strong adhesion between polyethylene and copper, or to any other metal, that was obtained by exposure of the polyethylene-metal composite to the light radiation from the plasma arc was not achievable by the use of infrared heat lamps or other heating means; an indication that the improved adhesion is not a result of heat alone.

What is claimed is:

1. A method of bonding a polymer of ethylene selected from the group consisting of polyethylene, ethylene-acrylyl copolymers, ethylene-vinyl acylate copolymers and ethylene-unsaturated hydrocarbon copolymers to a non-ceramic substrate which method comprises contacting the surface of said polymer of ethylene to the surface of said substrate with sufficient pressure to make an intimate contact therebetween thereby forming a composite article, irradiating the polymer surface of said article at a temperature up to the crystalline melting point of said polymer of ethylene with non-ionizing high intensity predominantly continuum light radiation having a source intensity of at least about 350 watts per square centimeter steradian when integrated throughout the entire spectral range of the continuum light radiation with a positive amount of up to 30 percent of the light radiated having wavelengths shorter than 4,000 angstroms and at least 70 percent of the light radiated having wavelengths longer than 4,000 angstroms emanating from a plasma arc light source for a period of time sufficient to improve the adhesive bond between the two.

2. A method as claimed in claim 1 wherein said ethylene polymer is adhesively bonded to aluminum.

3. A method as claimed in claim 1 wherein said ethylene polymer is adhesively bonded to a polyester.

4. A method as claimed in claim 3 wherein polyethylene is adhesively bonded to poly(ethylene terephthalate).

5. A method as claimed in claim 1 wherein said ethylene polymer is adhesively bonded to iron as the substrate.

6. A method as claimed in claim 5 wherein the bonded and irradiated article is postheated at a temperature below the crystalline melting point of the ethylene polymer.

7. A method as claimed in claim 1 wherein said ethylene polymer is adhesively bonded to copper.

8. A method as claimed in claim 1 wherein said ethylene polymer is adhesively bonded to a different ethylene polymer as defined in claim 1.

9. A method as claimed in claim 1 wherein said ethylene polymer is adhesively bonded to a polyamide.

10. A method as claimed in claim 1 wherein said ethylene polymer is adhesively bonded to a cellulosic substrate.

11. A method as claimed in claim 1 wherein said ethylene polymer is adhesively bonded to polystyrene.

12. A method as claimed in claim 1 wherein said ethylene polymer is adhesively bonded to poly(vinylidene chloride).

13. A method as claimed in claim 1 wherein said ethylene polymer contains therein a photosensitizer for crosslinking thereof.

References Cited
UNITED STATES PATENTS

| | | | |
|---|---|---|---|
| 3,146,146 | 8/1964 | Anderson | 156—272 X |
| 3,188,265 | 6/1965 | Charbonneau | 156—272 X |
| 3,424,638 | 1/1969 | Marans | 156—272 |

NORMAN G. TORCHIN, Primary Examiner

W. H. LOUIE, Jr., Assistant Examiner

U.S. Cl. X.R.

156—273; 171—93.31; 161—188